US009188139B2

(12) United States Patent
Yoshihara

(10) Patent No.: US 9,188,139 B2
(45) Date of Patent: Nov. 17, 2015

(54) ACCUMULATOR

(71) Applicant: EAGLE INDUSTRY CO., LTD., Tokyo (JP)

(72) Inventor: Hisao Yoshihara, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 14/366,957

(22) PCT Filed: May 14, 2013

(86) PCT No.: PCT/JP2013/063347
§ 371 (c)(1),
(2) Date: Jun. 19, 2014

(87) PCT Pub. No.: WO2013/187165
PCT Pub. Date: Dec. 19, 2013

(65) Prior Publication Data

US 2014/0311604 A1 Oct. 23, 2014

(30) Foreign Application Priority Data

Jun. 11, 2012 (JP) ................................. 2012-131830

(51) Int. Cl.
*F16L 55/04* (2006.01)
*F15B 1/08* (2006.01)
(Continued)

(52) U.S. Cl.
CPC . *F15B 1/08* (2013.01); *F15B 1/103* (2013.01); *F15B 20/007* (2013.01); *F15B 1/083* (2013.01);
(Continued)

(58) Field of Classification Search
CPC ............ F15B 1/08; F15B 1/103; F15B 20/00; F15B 20/1007; F15B 2201/3153; F15B 2201/3158; F16L 55/053
USPC ..................... 138/26, 30, 31; 137/797, 68.11; 220/721
See application file for complete search history.

(56) References Cited

U.S. PATENT DOCUMENTS 3,960,178 A 6/1976 Mercier
6,502,828 B1 * 1/2003 Sasaki .......................... 277/590
(Continued)

FOREIGN PATENT DOCUMENTS

JP 2003-172301 A 6/2003
JP 2005-282729 A 10/2005
(Continued)

OTHER PUBLICATIONS

Extended European Search Report for Application No. EP 13 80 4025 dated Sep. 7, 2015 (6 pages).

*Primary Examiner* — Patrick F Brinson
(74) *Attorney, Agent, or Firm* — Harness, Dickey & Pierce, P.L.C.

(57) ABSTRACT

In order to provide an accumulator equipped with an emergency safety mechanism that is capable of being activated at a lower pressure than when a rupture disk is disposed on part of the circumference of the peripheral surface of a stay, the accumulator has an emergency safety mechanism that immediately releases pressure inside a housing to an oil port side when the inside of the housing reaches a high temperature and high pressure in an emergency such as a fire. The emergency safety mechanism allows a fluid chamber and the oil port to communicate via a first pressure release flow passage, which is formed due to a seal holder provided with recesses and projections on part of the circumference being seated on a seating surface, and a second pressure release flow passage formed due to a rubber-like elastic body of the seal disappearing as a result of the high temperature.

5 Claims, 10 Drawing Sheets

(51) Int. Cl.
*F15B 1/10* (2006.01)
*F15B 20/00* (2006.01)

(52) U.S. Cl.
CPC ... *F15B 2201/205* (2013.01); *F15B 2201/3153* (2013.01); *F15B 2201/3156* (2013.01); *F15B 2201/3158* (2013.01)

(56) References Cited

U.S. PATENT DOCUMENTS

| | | | | |
|---|---|---|---|---|
| 6,810,915 | B2 * | 11/2004 | Umetsu et al. | 138/31 |
| 7,318,452 | B2 * | 1/2008 | Yoshihara et al. | 138/30 |
| 7,325,571 | B2 * | 2/2008 | Shimbori et al. | 138/30 |
| 7,628,175 | B2 * | 12/2009 | Miyake et al. | 138/30 |
| 7,770,599 | B2 * | 8/2010 | Ota et al. | 138/31 |
| 8,365,772 | B2 * | 2/2013 | Arikawa et al. | 138/30 |
| 2002/0107085 | A1 | 8/2002 | Lee et al. | |
| 2003/0116209 | A1 * | 6/2003 | Umetsu et al. | 138/31 |
| 2006/0037658 | A1 * | 2/2006 | Shimbori et al. | 138/30 |
| 2007/0102052 | A1 * | 5/2007 | Yoshihara et al. | 138/30 |
| 2009/0133768 | A1 * | 5/2009 | Miyake et al. | 138/30 |
| 2010/0108168 | A1 * | 5/2010 | Ota et al. | 138/30 |
| 2010/0210371 | A1 | 8/2010 | Sato et al. | |

FOREIGN PATENT DOCUMENTS

| | | | |
|---|---|---|---|
| JP | 2006-010005 | A | 1/2006 |
| JP | 2009-236137 | A | 10/2009 |
| JP | 2010-121637 | A | 6/2010 |
| JP | 2010-151286 | A | 7/2010 |
| JP | 2010-281443 | A | 12/2010 |

* cited by examiner

Prior Art

ACCUMULATOR

CROSS-REFERENCE TO RELATED APPLICATIONS

This application is a U.S. National Stage Application of International Application No. PCT/JP2013/063347, filed on May 14, 2013 and published in Japanese as WO 2013/187165 on Dec. 19, 2013. This application claims the benefit of Japanese Application No. 2012-131830, filed on Jun. 11, 2012. The disclosures of the above applications are incorporated herein by reference.

BACKGROUND OF THE INVENTION

1. Field of the Invention

The present invention relates to an accumulator which is used as a pressure accumulator or a pulsation pressure damping device. The accumulator according to the present invention is used, for example, in a hydraulic system for a motor vehicle or a hydraulic system for an industrial equipment.

2. Description of the Conventional Art

Conventionally, as shown in FIG. 10, there has been known an accumulator 51 structured such that an accumulator housing 52 is provided with a gas filling port 54 as well as being provided with an oil port 53 which is connected to a pressure piping (not shown), an internal space of the accumulator housing 52 is sectioned into a gas chamber 57 filling the gas, and a fluid chamber 58 communicating with the oil port 53, by a bellows 55 and a bellows cap 56, and the accumulator 51 is activated to accumulate pressure and damp pulsation pressure on the basis of movement of the bellows cap 56, and extension and contraction of the bellows 55 so that gas pressure and liquid pressure balance (refer to Japanese Unexamined Patent Publication No. 2003-172301).

Further, the accumulator 51 is provided with a safety mechanism (a safety mechanism for a pressure decreasing time) 59 which prevents the bellows 55 from being damaged due to the unbalance between the gas pressure and the liquid pressure in the case that the pressure of the fluid chamber 58 is decreased together with the pressure decrease of the pressure piping. In other words, in the case that the pressure of the pressure piping is extremely decreased due to the operation stop of the equipment, the liquid (oil) is discharged little by little from the oil port 53, the bellows 55 is contracted little by little by the filled gas pressure according to the liquid discharge, and a seal 60 provided in a lower surface of the bellows cap 56 comes into contact with an end surface of a stay 61 so as to form a so-called zero-down state. The stay 61 is a metal molded part in which a liquid entrance port 61*c* is provided in an end surface portion 61*b* in a leading end of a tubular portion 61*a*. In the zero-down state, a part of the liquid is trapped within the fluid chamber 58 by the seal 60, and the pressure of the trapped liquid and the gas pressure of the gas chamber 57 are balanced. Therefore, the bellows 55 is inhibited from being damaged due to an excess stress applied to the bellows 55.

Further, the accumulator 51 is provided with a safety mechanism (an emergency safety mechanism) 62 which prevents the liquid within the fluid chamber and the gas within the gas chamber 57 from rapidly expanding in an emergency such as a fire occurrence and prevents the accumulator 51 from exploding. In other words, in the case that the liquid within the fluid chamber 58 and the gas within the gas chamber 57 rapidly expanding due to the fire occurrence, a rupture disc (a weak portion) 61*d* provided in a part on a circumference of a peripheral surface (the tubular portion 61*a*) of the stay 61 bursts due to the high pressure, and the high pressure is released from the burst portion. Therefore, it is possible to inhibit an internal portion of the accumulator 51 from coming to an extremely high pressure and exploding.

However, in the prior art mentioned above, since the emergency safety mechanism 62 is constructed by the rupture disc 61*d* which is provided in the part on the circumference of the peripheral surface (the tube portion 61*a*) of the stay as mentioned above, the burst pressure becomes higher (such a great pressure as to burst the metal plate is necessary). As a result, there is a disadvantage that the emergency safety mechanism 62 is not activated until the extremely high pressure is established. Further, in order to form the rupture disc 61*d* in the part on the circumference of the peripheral surface (the tubular portion 61*a*) of the stay 61, it is necessary to press the stay 61 and thereafter additionally execute a cutting work. Therefore, there is a disadvantage that it take a lot of man hour and time to manufacture the stay 61.

SUMMARY OF THE INVENTION

Problem to be Solved by the Invention

The present invention is made by taking the above points into consideration, and an object of the present invention is to provide an accumulator provided with an emergency safety mechanism which can be activated by a lower pressure than that in the case that the rupture disc is provided in the part on the circumference of the peripheral surface of the stay.

Means for Solving the Problem

In order to achieve the object mentioned above, an accumulator according to a first aspect of the present invention is an accumulator comprising:

an accumulator housing which is provided with an oil port connected to a pressure piping and is provided with a gas filling port;

a bellows and a bellows cap which section an internal space of the housing into a gas chamber filling gas therein and a fluid chamber communicating with the oil port;

a pressure decreasing time safety mechanism which has a seal holder fixed to the bellows cap and a seal retained to the seal holder, and seals the fluid chamber by seating the seal on a seat surface in an inner portion of the housing in the case that the pressure of the fluid chamber is decreased in connection with the pressure decrease of the pressure piping, whereby a part of the liquid is trapped in the fluid chamber; and an emergency safety mechanism which urgently opens the pressure in the inner portion of the housing to the oil port side in the case that the inner portion of the housing comes to a high temperature and a high pressure in an emergency such as fire occurrence, wherein the emergency safety mechanism communicates the fluid chamber and the oil port via a first pressure release flow passage which is formed by seating the seal holder having concavities and convexities in a part on a circumference on the seat surface, and a second pressure release flow passage which is formed by disappearance of a rubber-like elastic body of the seal due to the high temperature.

Further, an accumulator according to a second aspect of the present invention is the accumulator described in the first aspect mentioned above, wherein the seal has a structure in which the rubber-like elastic body is attached to a metal member, and the second pressure release flow passage is formed between the metal member and the seat surface by engagement of the metal member with the seal holder after disappearance of the rubber-like elastic body.

Further, an accumulator according to a third aspect of the present invention is the accumulator described in the first aspect or the second aspect mentioned above, wherein the accumulator is an internal gas type accumulator in which the gas chamber is arranged in an inner peripheral side of the bellows and the seat surface is formed by an inner end surface of the housing, or wherein the accumulator is an external gas type accumulator in which the gas chamber is arranged in an outer peripheral side of the bellows and the seat surface is formed by an end surface of a stay fixed to the inner portion of the housing.

In the accumulator according to the present invention having the structure mentioned above, the emergency safety mechanism is structured such as to communicate the fluid chamber and the oil port via the first pressure release flow passage which is formed by seating the seal holder having the concavities and convexities in the part on the circumference on the seat surface in the inner portion of the housing, and the second pressure release flow passage which is formed by the disappearance of the rubber-like elastic body of the seal due to the high temperature. Therefore, since the emergency safety mechanism is activated by the disappearance of the rubber-like elastic body of the seat without application of such a great pressure as to burst the stay, there can be provided the emergency safety mechanism which can be activated by the lower pressure in comparison with the case of bursting the stay.

The seal can be structured such that the rubber-elastic body is attached to the metal member. In this case, the pressure decreasing time safety mechanism and the emergency safety mechanism are respectively activated as follows.

(1) Pressure Decreasing Time Safety Mechanism

In the case that the pressure of the pressure piping is extremely decreased by the stop of the operation of the equipment, the liquid (the oil) is discharged little by little from the oil port, and the bellows cap moves in a direction of moving close to the oil port by the sealed gas pressure together with the liquid discharge. In the case that the bellows cap sufficiently comes close to the oil port, the rubber-like elastic body of the seal which is retained to the bellows cap via the seal holder seats on the seat surface so as to achieve a sealing action, and close the fluid chamber. Therefore, since the partial liquid is trapped within the fluid chamber, and the pressure of the trapped liquid and the gas pressure of the gas chamber balance, it is possible to inhibit the excessive stress from being applied to the bellows and inhibit the bellows from being damaged.

(2) Emergency Safety Mechanism

In the case that the liquid within the fluid chamber and the gas within the gas chamber rapidly expand due to the occurrence of the fire, the bellows cap moves in the direction of moving close to the oil port due to the high temperature and the high pressure of the liquid and the gas, and the rubber-like elastic body of the seal which is retained to the bellows cap via the seal holder disappears (is burned down). In the case that the rubber-like elastic body disappears, the seal holder seats on the seat surface in place of the rubber-like elastic body, however, since the seal holder is previously provided with the concavities and convexities in the part on the circumference, the first pressure release flow passage is formed between the seal holder and the seat surface by the concavities and convexities. On the other hand, the rubber-elastic body disappears in the seal and the seal is formed only by the metal member. Further, since the metal member stops at a position which is away from the seat surface without seating on the seat surface by the engagement with the seal holder, the second pressure release flow passage is formed between the metal member and the seat surface. Therefore, the fluid chamber is communicated with the oil port by the first and second pressure release flow passages, and the pressure within the fluid chamber is released to the pressure piping side via the oil port. Further, since the bellows is damaged by the high pressure in this state, the pressure within the gas chamber is released by the same route.

The present invention is applied to the internal gas type accumulator in which the gas chamber is arranged in the inner peripheral side of the bellows, and is also applied to the external gas type accumulator in which the gas chamber is arranged in the outer peripheral side of the bellows. In the case of the internal gas type, it is often the case that the seat surface on which the seal or the seal holder seats is formed by an internal end surface of the housing, and in the case of the external gas type, it is often the case that the seat surface is formed by an end surface of the stay which is fixed to the inner portion of the housing.

Effect of the Invention

The present invention achieves the following effects.

More specifically, in the present invention, since the emergency safety mechanism is activated by the application of such the high temperature as to cause the rubber-like elastic body of the seal to disappear without application of such the great pressure as to burst the stay, as mentioned above, the emergency safety mechanism is activated by the lower pressure in comparison with the prior art. Therefore, there can be provided the internal gas type accumulator or the external gas type accumulator which has a good sensitivity and can achieve an excellent explosion protection performance.

DETAILED DESCRIPTION OF PREFERRED EMBODIMENTS

The following embodiments are included in the present invention.

(1) After the seal disappears in case of fire by installation of a depressurizing mechanism in the seal holder, a backup fluid is discharged, the bellows is damaged and the internal pressure is released.

(2)

(2-1) A pressure relief mechanism (a groove, a projection or a plurality of supports) is installed in the seal holder.

(2-2) A thickness of the seal holder is made larger than a depression of the shell (the stay).

(2-3) An outer diameter of a gasket metal ring (the metal member of the seal) is made larger than an inner diameter of the seal holder.

(2-4) The seal holder and the shell (the stay) may be in metal touch in the normal use while taking a sealing function into consideration.

EMBODIMENTS

Next, a description will be given of embodiments according to the present invention with reference to the accompanying drawings.

First Embodiment

Figure 1:
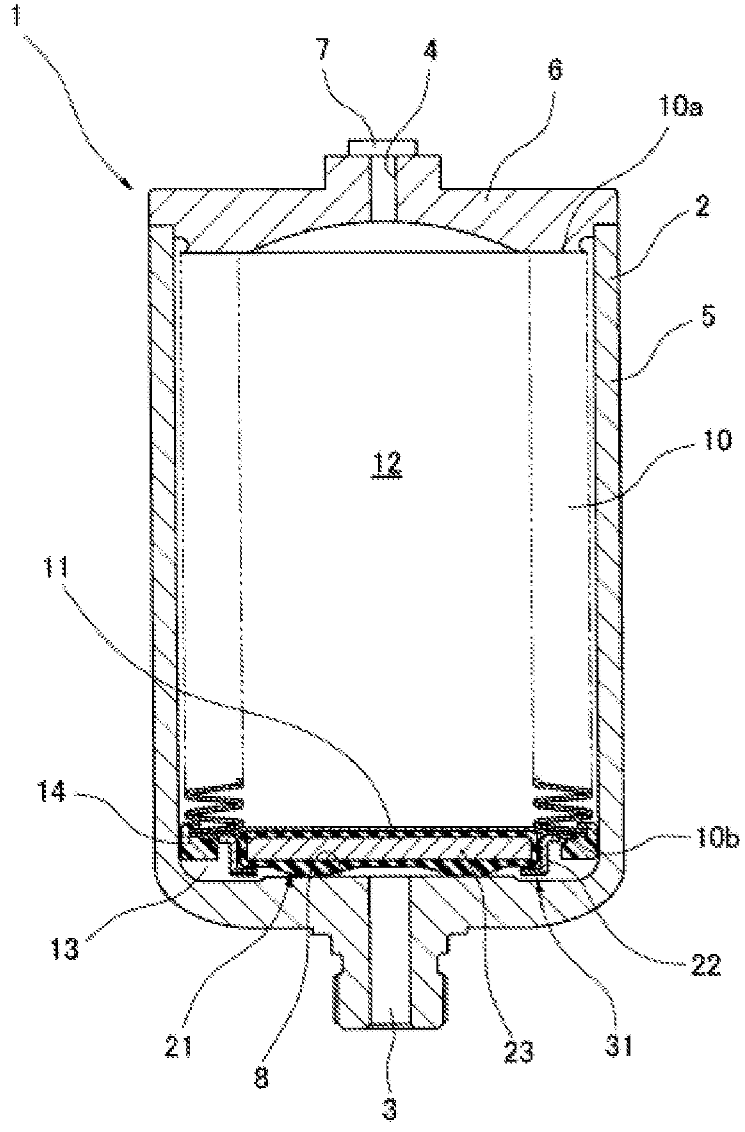
FIG. 1 is a cross sectional view of an accumulator according to a first embodiment of the present invention.

FIG. 1 shows an accumulator 1 according to a first embodiment of the present invention. The accumulator 1 according to the present embodiment is a metal bellows type accumulator employing a metal bellows as a bellows 10, and is structured as follows.

More specifically, there is provided an accumulator housing 2 which is provided with an oil port 3 connected to a pressure piping (not shown) in one end (a lower end in the drawing) and is provided with a gas filling port 4 in the other end (an upper end in the drawing), the bellows 10 and a bellows cap 11 are arranged in an inner portion of the housing 2, and an inner portion of the housing 2 is sectioned into a gas chamber 12 which is filled with high-pressure gas (for example, nitrogen gas), and a fluid chamber 13 which is communicated with an oil port 3. The housing 2 is described as a structure which is constructed by a closed-end cylindrical shell 5, and an end cover 6 which is fixed (welded) to an one end opening portion (an upper end opening portion in the drawing) of the shell 5, however, a parts arrangement structure of the housing 2 is not particularly limited. For example, the end cover 6 and the shell 5 may be integrated, and a bottom portion of the shell 5 may be constructed by an oil port member which is independent from the shell 5. In any case, the end cover 6 or the corresponding part is provided with the gas filling port 4 for filling the gas chamber 12 with the gas, and the gas filling port 4 is closed by a gas plug 7 after being filled with the gas.

The bellows 10 is structured such that a fixed end (an upper end in the drawing) 10*a* is fixed (welded) to the end cover 6, and a discoid bellows cap 11 is fixed (welded) to a floating end (a lower end in the drawing) 10*b*. As a result, the accumulator 1 is formed as an internal gas type accumulator in which the gas chamber 12 is set in an inner peripheral side of the bellows 10 and the fluid chamber 13 is set in an outer peripheral side of the bellows 10. The bellows 10 may be structured such that the fixed end 10*a* is fixed (welded) to the bottom portion of the shell 5 and the discoid bellows cap 11 is fixed (welded) to the floating end 10*b* thereof. In this case, the accumulator is formed as an external gas type accumulator in which the gas chamber 12 is set in the outer peripheral side of the bellows 10 and the fluid chamber 13 is set in the inner peripheral side of the bellows 10. In any case, a damping ring 14 is attached to an outer peripheral portion of the bellows cap 11 so as to prevent the bellows 10 and the bellows cap 11 from coming into contact with the inner surface of the housing 2, however, the damping ring 14 does not serve as a sealing action.

Further, the accumulator 1 is provided with a pressure decreasing time safety mechanism 21 for preventing the bellows 10 from being damaged due to unbalance between the gas pressure and the liquid pressure in the case that the pressure of the fluid chamber 13 is decreased together with the pressure decrease of the pressure piping.

The pressure decreasing time safety mechanism 21 is structured such that a seal 23 seats on a seat surface 8 in the inner portion of the housing in the case that the pressure of the fluid chamber 13 is decreased together with the pressure decrease of the pressure piping, thereby sealing the fluid chamber 13 and trapping the partial liquid in the fluid chamber 13, and is constructed as follows.

Figure 2:
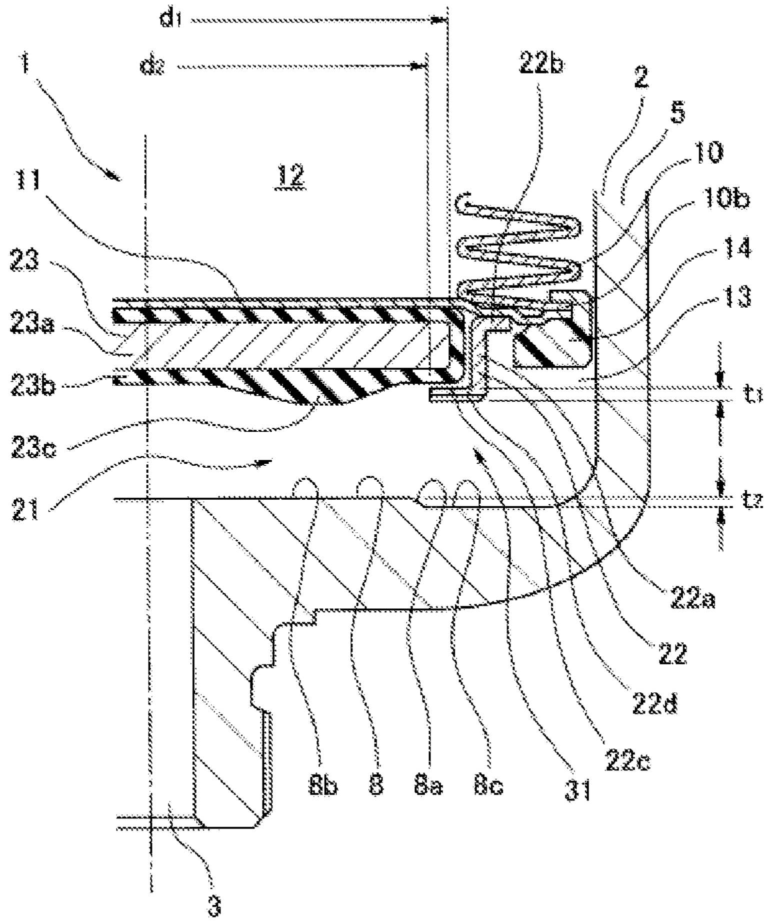
FIG. 2 is an enlarged cross sectional view of a substantial part of the accumulator and is a view showing a state in which the accumulator is activated in a steady state.
Figure 3:
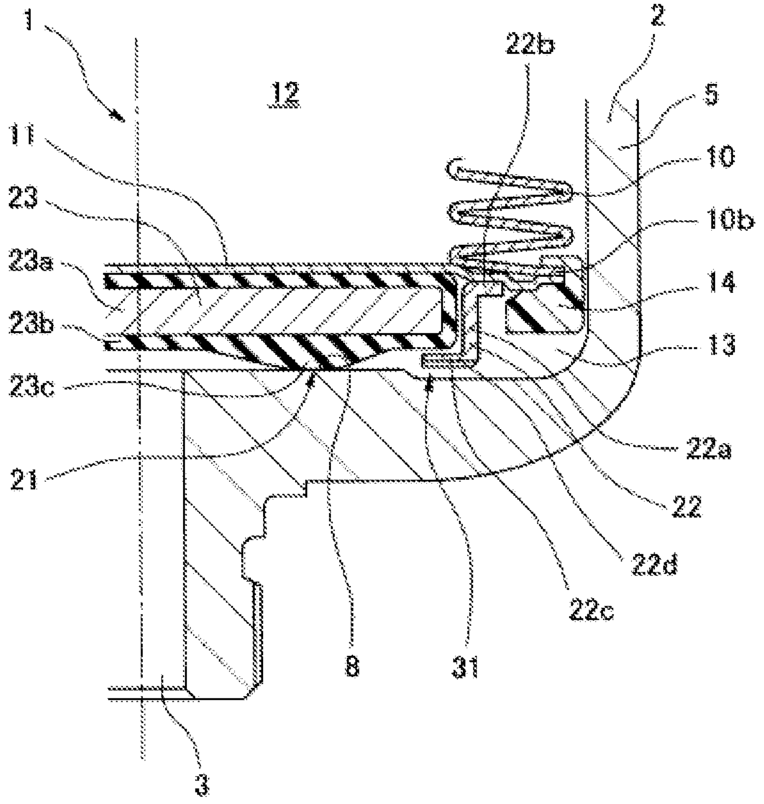
FIG. 3 is an enlarged cross sectional view of a substantial part of the accumulator and is a view showing a state in which a pressure decreasing time safety mechanism is activated.

More specifically, as shown in an enlarged manner in FIG. 2, an annular seal holder 22 is fixed to a surface (a lower surface in the drawing) close to the oil port in the bellows cap 11, the discoid seal 23 is retained by the seal holder 22, and the seal 23 seats on the seat surface 8 in the inner portion of the housing as shown in FIG. 3 by the movement of the bellows cap 11 in a direction of coming close to the oil port 3 (a downward direction in the drawing), whereby a portion between the bellows cap 11 and the housing 2 is sealed via the seal 23 and the fluid chamber 13 is occluded. As a result, since the partial liquid is trapped within the fluid chamber 13, and the pressure of the trapped liquid is balanced with the gas pressure of the gas chamber 12, it is possible to inhibit any excessive stress from acting on the bellows 10 and inhibit the bellows 10 from being damaged.

The seal holder 22 is constructed by a single metal molded part (a sheet metal press part, and is structured such that one end (an upper end in the drawing) of a tubular portion 22*a* is provided with an outward flange-like fixing portion 22*b* for fixing (welding) the seal holder 22 to the bellows cap 11, and the other end (a lower end in the drawing) of the tubular portion 22*a* is provided with an inward flange-like retaining portion 22*c* for retaining the seal 23.

The seal 23 is structured such that a rubber-like elastic body 23*b* is attached (vulcanization bonded) to a part or a whole of a surface of the discoid metal member 23*a*, and a surface (a lower surface in the drawing) close to the oil port is provided with an annular seal projection 23*c* for making the rubber-like elastic body 23*b* easily reach the seat surface 8 and partly enhancing a seal surface pressure at the seating time as a part of the rubber-like elastic body 23*b*.

The seat surface 8 is formed by an internal end surface of the planate housing 2 which surrounds an opening portion of the oil port 3.

Further, the accumulator 1 is provided with an emergency safety mechanism 31 for preventing the accumulator 1 from being exploded due to a rapid expansion of the liquid within the fluid chamber 13 and the gas within the gas chamber 12 in an emergency such as fire occurrence.

The emergency safety mechanism 31 is structured such as to urgently release the pressure (the liquid pressure and the gas pressure) in the inner portion of the housing 2 to the oil port 3 side in the case that the inner portion of the emergency housing 2 comes to the high temperature and the high pressure due to the fire occurrence, and is constructed as follows.

More specifically, as shown in an enlarged manner in FIG. 2, a desired number of groove portions 22*d* are provided (for example, four groove portions 22*d* are uniformly provided) in a surface (a lower surface in the drawing) seating on the seat surface 8 of the inward flange-like retaining portion 22*c* in the seal holder 22, the groove portions 22*d* passing through in a diametrical direction as concavities and convexities partly provided on a circumference. As a result, even in the case that the seal holder 22 seats on the seat surface 8, it is possible to communicate the fluid chamber 13 with the oil port 3. Further, since an outer diameter d1 of the discoid metal member 23*a* in the seal 23 is set to be larger than an inner diameter d2 of the inward flange-like retaining portion 22*c* in the seal holder 22, the metal member 23*a* can be engaged with the flange-like retaining portion 22*c*. As a result, even in the case that the rubber-like elastic body 23*b* of the seal 23 is burnt down due to the high temperature in an emergency, the metal member 23*a* does not seat on the seat surface 8 but stops at a position which is away from the seat surface 8, and it is possible to communicate the fluid chamber 13 with the oil port 3.

Figure 4:
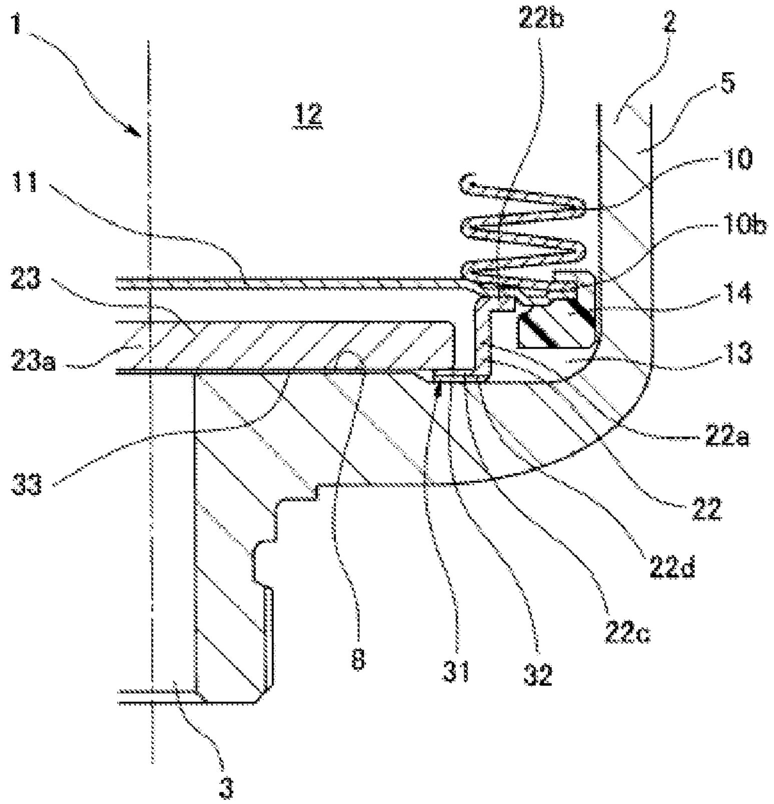
FIG. 4 is an enlarged cross sectional view of a substantial part of the accumulator and is a view showing a state in which an emergency safety mechanism is activated.

Therefore, in the emergency safety mechanism 31, as shown in FIG. 4, a first pressure release flow passage 32 is formed by the grooves 22*d* in the case that the seal holder 22 provided within the grooves 22*d* passing through in the diametrical direction as the partial concavities and convexities on the circumference seats on the seat surface 8, and a second pressure release flow passage 33 is formed between the metal member 23*a* and the seat surface 8 on the basis of the engagement in the case that the rubber-like elastic body 23*b* of the seal 23 is burnt down by the high temperature in an emergency. Therefore, it is possible to urgently release the internal pressure (the liquid pressure and the gas pressure) of the housing 2 to the oil port 3 side via the flow passages 31 and 32, and it is possible to inhibit the housing 2 from being exploded.

As shown in FIG. 2, in the case that an annular step 8*a* is formed in the seat surface 8, a height position of a seat surface 8*b* in an inner peripheral side is set to be higher than a height position of a seat surface 8*c* in an outer peripheral side, the seal 23 is set to seat on the seat surface 8*b* in the inner peripheral side and the seal holder 22 is set to seat on the seat surface 8*c* in the outer peripheral side, a thickness t1 of the inward flange-like retaining portion 22*c* in the seal holder 22 is set to be larger than a height t2 of the step 8*a*, whereby the second pressure release flow passage 32 is secured between the metal member 23*a* and the seat surface 8 as shown in FIG. 4.

In the accumulator 1 having the structure mentioned above, since the grooves 22*d* are already formed in the seal holder 22, the emergency safety mechanism 31 is immediately activated by the disappearance of the rubber-like elastic body 23*b* of the seal 23. Therefore, since the emergency safety mechanism 31 is activated by the disappearance of the rubber-like elastic body 23*b* of the seal 23 without application of such a great pressure as to burst the stay in the prior art, there can be provided the emergency safety mechanism 31 which can be activated by the lower pressure in comparison with the case of bursting the stay. Further, since the seal holder 22 is manufactured only by press molding and does not require any cutting process, the seal holder 22 can be comparatively easily manufactured.

Second Embodiment

Figure 5:
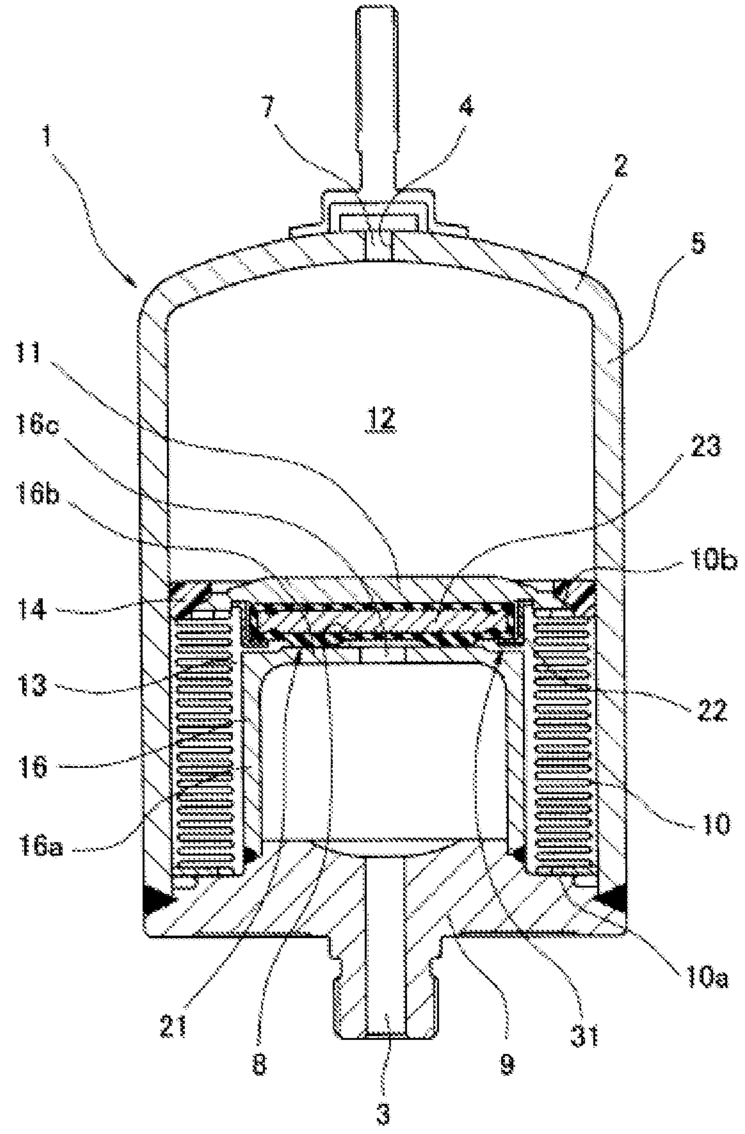
FIG. 5 is a cross sectional view of an accumulator according to a second embodiment of the present invention.

FIG. 5 shows an accumulator 1 according to a second embodiment of the present invention. The accumulator 1 according to the present embodiment is a metal bellows type accumulator employing a metal bellows as a bellows 10, and is structured as follows.

More specifically, there is provided an accumulator housing 2 which is provided with an oil port 3 connected to a pressure piping (not shown) in one end (a lower end in the drawing) and is provided with a gas filling port 4 in the other end (an upper end in the drawing), the bellows 10 and a bellows cap 11 are arranged in an inner portion of the housing 2, and an inner portion of the housing 2 is sectioned into a gas chamber 12 which is filled with high-pressure gas (for example, nitrogen gas), and a fluid chamber 13 which is communicated with an oil port 3. The housing 2 is described as a structure which is constructed by a closed-end cylindrical shell 5, and an oil port member 9 which is fixed (welded) to an one end opening portion (a lower end opening portion in the drawing) of the shell 5, however, a parts arrangement structure of the housing 2 is not particularly limited. For example, the oil port member 9 and the shell 5 may be integrated, and a bottom portion of the shell 5 may be constructed by an end cover which is independent from the shell 5. In any case, the bottom portion of the shell 4 or the corresponding part is provided with the gas filling port 4 for filling the gas chamber 12 with the gas, and the gas filling port 4 is closed by a gas plug 7 after being filled with the gas.

The bellows 10 is structured such that a fixed end (a lower end in the drawing) 10*a* is fixed (welded) to the oil port member 9, and a discoid bellows cap 11 is fixed (welded) to a floating end (an upper end in the drawing) 10*b*. As a result, the accumulator 1 is formed as an external gas type accumulator in which the gas chamber 12 is set in an outer peripheral side of the bellows 10 and the fluid chamber 13 is set in an inner peripheral side of the bellows 10. The bellows 10 may be structured such that the fixed end 10*a* is fixed (welded) to the bottom portion of the shell 5 and the discoid bellows cap 11 is fixed (welded) to the floating end 10*b* thereof. In this case, the accumulator is formed as an internal gas type accumulator in which the gas chamber 12 is set in the inner peripheral side of the bellows 10 and the fluid chamber 13 is set in the outer peripheral side of the bellows 10. In any case, a damping ring 14 is attached to an outer peripheral portion of the bellows cap 11 so as to prevent the bellows 10 and the bellows cap 11 from coming into contact with the inner surface of the housing 2, however, the damping ring 14 does not serve as a sealing action.

A stay (an internal pedestal) 16 is arranged in an inner surface of the oil port member 6 which is an inner surface close to the oil port 3 of the housing 2 in an inner peripheral side of the bellows 10, and the bellows 10 is arranged in an outer peripheral side of the stay 16.

The stay 16 is formed by a single metal molded part (a sheet metal press part), is structured such that an end surface portion 16*b* is integrally formed in one end (an upper end in the drawing) of a tubular portion 16*a* toward an inner side in a diametrical direction, and is fixed (welded) to the inner surface of the oil port member 6 by the other end (a lower end in the drawing) of the tubular portion 16*a*. A liquid entrance port 16*c* is provided in the center of the end surface portion 16*b* which is formed into an inward flange shape.

Further, the accumulator 1 is provided with a pressure decreasing time safety mechanism 21 for preventing the bellows 10 from being damaged due to unbalance between the gas pressure and the liquid pressure in the case that the pressure of the fluid chamber 13 is decreased together with the pressure decrease of the pressure piping.

The pressure decreasing time safety mechanism 21 is structured such that a seal 23 seats on a seat surface 8 which is provided in the end surface portion 16*b* of the stay 16 in the case that the pressure of the fluid chamber 13 is decreased together with the pressure decrease of the pressure piping, thereby sealing the fluid chamber 13 and trapping the partial liquid in the fluid chamber 13, and is constructed as follows.

Figure 6:
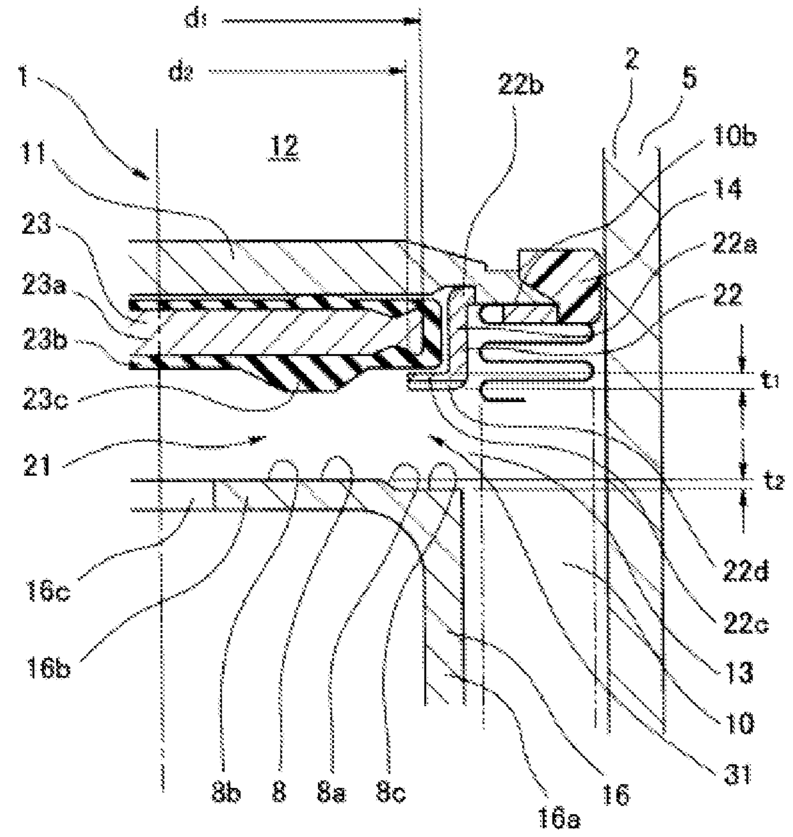
FIG. 6 is an enlarged cross sectional view of a substantial part of the accumulator and is a view showing a state in which the accumulator is activated in a steady state.
Figure 7:
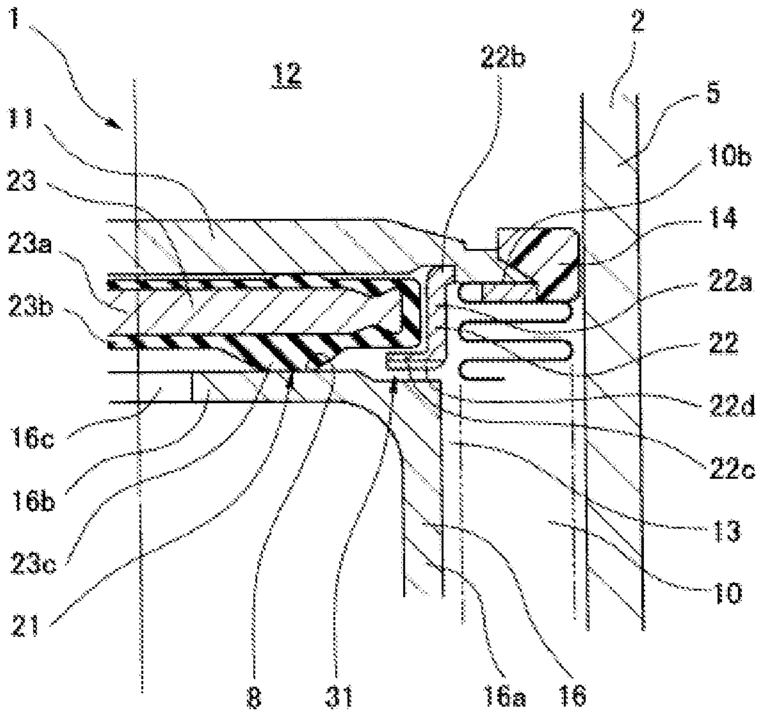
FIG. 7 is an enlarged cross sectional view of a substantial part of the accumulator and is a view showing a state in which a pressure decreasing time safety mechanism is activated.

More specifically, as shown in an enlarged manner in FIG. 6, an annular seal holder 22 is fixed to a surface (a lower surface in the drawing) close to the stay in the bellows cap 11, the discoid seal 23 is retained by the seal holder 22, and the seal 23 seats on the seat surface 8 which is provided in the end surface 16*b* of the stay 16 as shown in FIG. 7 by the movement of the bellows cap 11 in a direction of coming close to the stay 16 (a downward direction in the drawing), whereby a portion between the bellows cap 11 and the stay 16 is sealed via the seal 23 and the fluid chamber 13 is occluded. As a result, since the partial liquid is trapped within the fluid chamber 13, and the pressure of the trapped liquid is balanced with the gas pressure of the gas chamber 12, it is possible to inhibit any excessive stress from acting on the bellows 10 and inhibit the bellows 10 from being damaged.

The seal holder 22 is constructed by a single metal molded part (a sheet metal press part, and is structured such that one end (an upper end in the drawing) of a tubular portion 22*a* is provided with an outward flange-like fixing portion 22*b* for fixing (welding) the seal holder 22 to the bellows cap 11, and the other end (a lower end in the drawing) of the tubular portion 22*a* is provided with an inward flange-like retaining portion 22*c* for retaining the seal 23.

The seal 23 is structured such that a rubber-like elastic body 23*b* is attached (vulcanization bonded) to a part or a whole of a surface of the discoid metal member 23*a*, and a surface (a lower surface in the drawing) close to the oil port is provided with an annular seal projection 23*c* for making the rubber-like elastic body 23*b* easily reach the seat surface 8 and partly enhancing a seal surface pressure at the seating time as a part of the rubber-like elastic body 23*b*.

The seat surface 8 is formed by the end surface of the end surface portion 16*b* of the stay 16, as mentioned above.

Further, the accumulator 1 is provided with an emergency safety mechanism 31 for preventing the accumulator 1 from being exploded due to a rapid expansion of the liquid within the fluid chamber 13 and the gas within the gas chamber 12 in an emergency such as fire occurrence.

The emergency safety mechanism 31 is structured such as to urgently release the pressure in the inner portion of the housing 2 to the oil port 3 side in the case that the inner portion of the emergency housing 2 comes to the high temperature and the high pressure due to the fire occurrence, and is constructed as follows.

More specifically, as shown in an enlarged manner in FIG. 6, a desired number of groove portions 22*d* are provided (for example, four groove portions 22*d* are uniformly provided) in a surface (a lower surface in the drawing) seating on the seat surface 8 of the inward flange-like retaining portion 22*c* in the seal holder 22, the groove portions 22*d* passing through in a diametrical direction as concavities and convexities partly provided on a circumference. As a result, even in the case that the seal holder 22 seats on the seat surface 8, it is possible to communicate the fluid chamber 13 with the oil port 3. Further, since an outer diameter d1 of the discoid metal member 23*a* in the seal 23 is set to be larger than an inner diameter d2 of the inward flange-like retaining portion 22*c* in the seal holder 22, the metal member 23*a* can be engaged with the flange-like retaining portion 22*c*. As a result, even in the case that the rubber-like elastic body 23*b* of the seal 23 is burnt down due to the high temperature in an emergency, the metal member 23*a* does not seat on the seat surface 8 but stops at a position which is away from the seat surface 8, and it is possible to communicate the fluid chamber 13 with the oil port 3.

Figure 8:
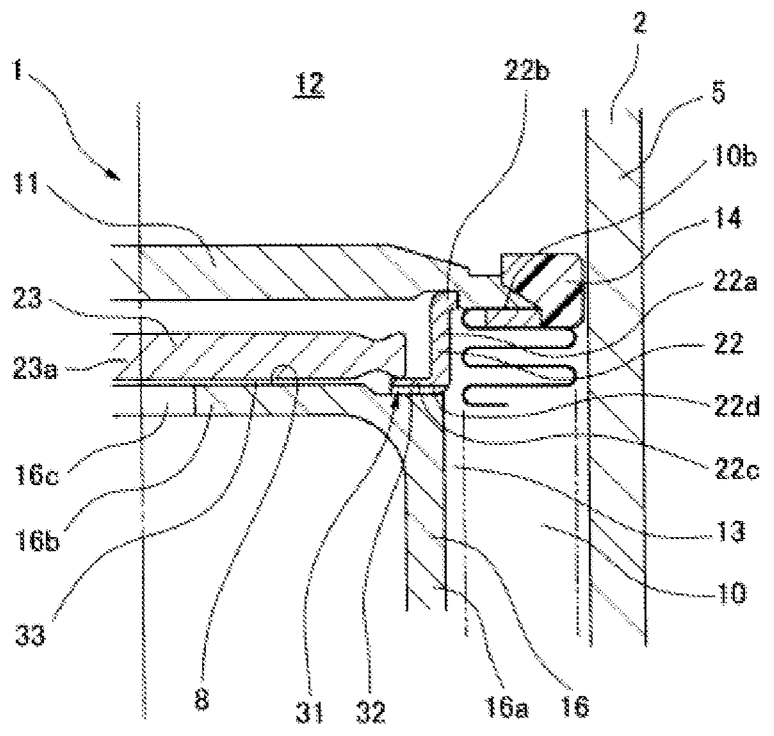
FIG. 8 is an enlarged cross sectional view of a substantial part of the accumulator and is a view showing a state in which an emergency safety mechanism is activated.

Therefore, in the emergency safety mechanism 31, as shown in FIG. 8, a first pressure release flow passage 32 is formed by the grooves 22*d* in the case that the seal holder 22 provided within the grooves 22*d* passing through in the diametrical direction as the partial concavities and convexities on the circumference seats on the seat surface 8, and a second pressure release flow passage 33 is formed between the metal member 23*a* and the seat surface 8 on the basis of the engagement in the case that the rubber-like elastic body 23*b* of the seal 23 is burnt down by the high temperature in an emergency. Therefore, it is possible to urgently release the internal pressure (the liquid pressure and the gas pressure) of the housing 2 to the oil port 3 side via the flow passages 31 and 32, and it is possible to inhibit the housing 2 from being exploded.

As shown in FIG. 6, in the case that an annular step 8*a* is formed in the seat surface 8, a height position of a seat surface 8*b* in an inner peripheral side is set to be higher than a height position of a seat surface 8*c* in an outer peripheral side, the seal 23 is set to seat on the seat surface 8*b* in the inner peripheral side and the seal holder 22 is set to seat on the seat surface 8*c* in the outer peripheral side, a thickness t1 of the inward flange-like retaining portion 22*c* in the seal holder 22 is set to be larger than a height t2 of the step 8*a*, whereby the second pressure release flow passage 32 is secured between the metal member 23*a* and the seat surface 8 as shown in FIG. 8.

In the accumulator 1 having the structure mentioned above, since the grooves 22*d* are already formed in the seal holder 22, the emergency safety mechanism 31 is immediately activated by the disappearance of the rubber-like elastic body 23*b* of the seal 23. Therefore, since the emergency safety mechanism 31 is activated by the disappearance of the rubber-like elastic body 23*b* of the seal 23 without application of such a great pressure as to burst the stay in the prior art, there can be provided the emergency safety mechanism 31 which can be activated by the lower pressure in comparison with the case of bursting the stay. Further, since the stay 16 and the seal holder are both manufactured only by press molding and does not require any cutting process, the seal holder 22 can be comparatively easily manufactured.

Other Embodiments

The following matters can be complemented to each of the embodiments mentioned above.

(1) In each of the embodiments mentioned above, the seal 23 is structured such as to be movable at a slight stroke in an expanding and contracting direction of the bellows 10 (a vertical direction in each of the drawings) (such that the seal 23, the seal holder 22 and the bellows cap 11 can relatively displace in the same direction) in a state in which the seal 23 is retained to the seal holder 22, and is energized by a spring means (not shown) so as to be set to a position of being in contact with the bellows cap 11. In this state, the pressure decreasing time safety mechanism 21 is activated as shown in FIG. 3 or 7, that is, the rubber-like elastic body 23*b* of the seal 23 seats on the seat surface 8. In this seating state, in the case that the liquid trapped within the fluid chamber 13 and the gas sealed in the gas chamber 57 is expanded by an ascent of the atmospheric air temperature, unbalance is generated between the liquid pressure and the gas pressure since the liquid has a greater thermal expansion ratio, however, the seal holder 22 and the bellows cap 11 move in a direction that they move away from the oil port 3 or the stay 16 (in an upward direction in each of the drawings) so as to dissolve the unbalance. At this time, the seal 23 is pressed by the liquid pressure and stays seating on the seat surface 8. Therefore, according to the accumulator 1 of each of the embodiments, it is possible to dissolve the unbalance between the liquid pressure and the gas pressure which is generated by the ascent of the atmospheric air temperature.

(2) In each of the embodiments mentioned above, the figure is drawn in such a manner that the seal holder 22 does not reach the seat surface 8 yet and does not seat on the seat surface 8 when the pressure decreasing time safety mechanism 21 is activated, that is, the rubber-like elastic body 23*b* of the seal 23 seats on the seat surface 8 as shown in FIG. 3 or 7, however, in this case, the seal holder 22 may seat at the same time of the rubber-like elastic body 23*b*, or may be seat prior to the rubber-like elastic body 23*b*.

(3) In each of the embodiments mentioned above, the figure is drawn in such a manner that a whole of the rubber-like elastic body 23*b* of the seal 23 disappears as shown in FIG. 4 or 8 when the emergency safety mechanism 31 is activated, however, the rubber-like elastic body 23*b* may only partly disappear as long as the second pressure release flow passage 33 is formed.

(4) Various shapes can be thought as the structure in which the seal holder 22 is provided with the partial concavities and convexities on the circumference, however, any shape may be employed as long as the first pressure release flow passage 32 is formed in the case that the seal holder 22 seats on the seat surface 8.

Figure 9C:
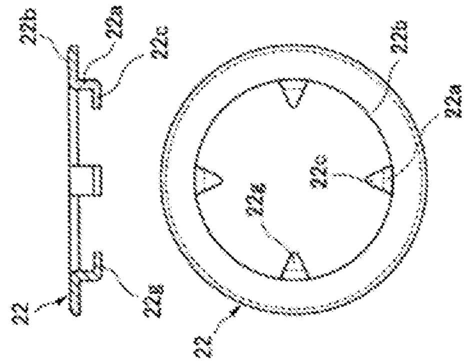
FIGS. 9A, 9B and 9C are cross sectional views and bottom elevational views respectively showing the other examples of a seal holder.
Figure 9B:
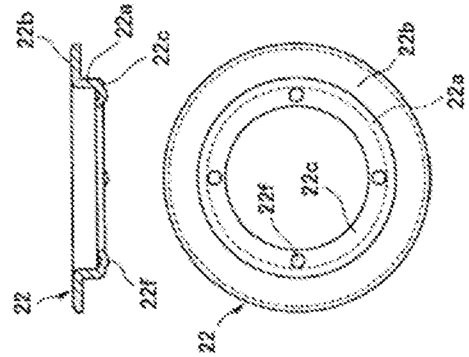
Figure 9A:
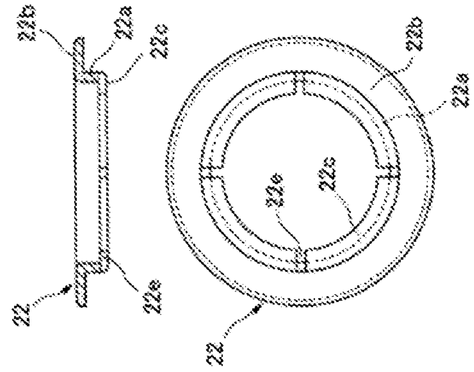
Figure 10:
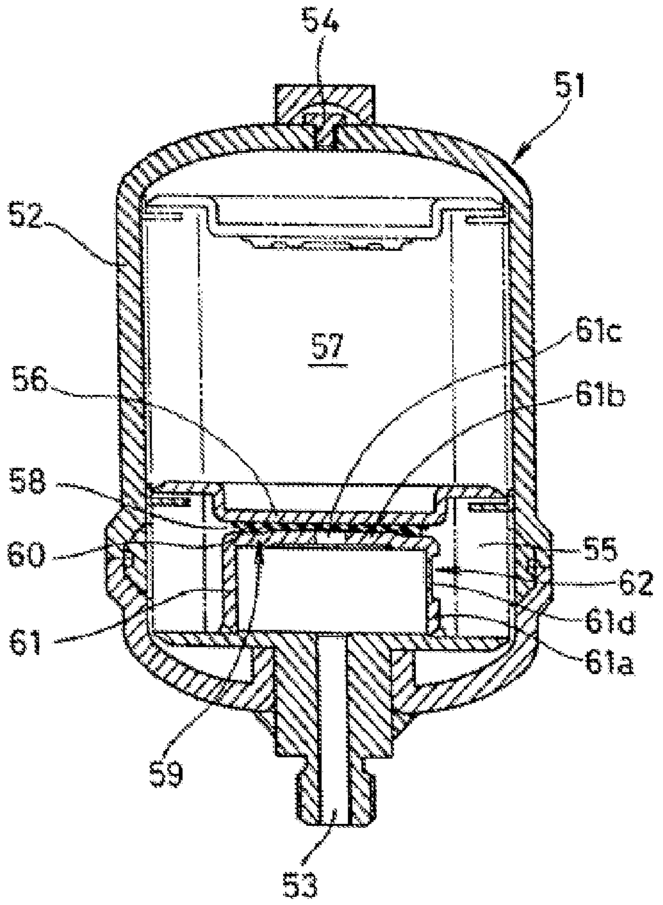
FIG. 10 is a cross sectional view of an accumulator according to a prior art.

For example, in FIG. 9A, a desired number of notches 22*e* are provided (for example, four notches are uniformly provided) as the partial concavities and convexities on the circumference in the inward flange-like retaining portion 22*c* in the seal holder 22, the notches 22*e* passing through in a diametrical direction. The notch 22*e* reaches a whole thickness of the retaining portion 22*c*.

In FIG. 9B, a desired number of projections 22*f* are provided (for example, four projections are uniformly provided) as the partial concavities and convexities on the circumference in the surface seating on the seat surface 8 of the inward flange-like retaining portion 22*c* in the seal holder 22.

In FIG. 9C, the tubular portion 22*a* and the inward flange-like retaining portion 22*c* I the seal holder 22 is divided into a plurality of pieces (for example, four uniform pieces) circumferentially, thereby forming tongue portions 22*g* which are formed as an L-shaped form in its cross section, and the first pressure release flow passage 32 is formed between the adjacent tongue portions 22*g*.

What is claimed is:

1. An accumulator comprising:

an accumulator housing which is provided with an oil port connected to a pressure piping and is provided with a gas filling port;

a bellows and a bellows cap which section an internal space of said housing into a gas chamber filling gas therein and a fluid chamber communicating with said oil port;

a pressure decreasing time safety mechanism which has a seal holder fixed to said bellows cap and a seal retained to said seal holder, and seals said fluid chamber by seating said seal on a seat surface in an inner portion of the housing in the case that the pressure of said fluid chamber is decreased in connection with the pressure decrease of said pressure piping, such that a part of the liquid is trapped in said fluid chamber; and an emergency safety mechanism which urgently opens the pressure in the inner portion of said housing to said oil port side in the case that the inner portion of said housing comes to a high temperature and a high pressure in an emergency, wherein said emergency safety mechanism communicates said fluid chamber and said oil port via a first pressure release flow passage which is formed by seating said seal holder having concavities and convexities in a part on a circumference on said seat surface, and a second pressure release flow passage which is formed by disappearance of an elastic body of said seal due to said high temperature, wherein said seal comprises a discoid metal member, said elastic body attached to at least a part a surface of said metal member, and an annular seal projection provided on a surface of said elastic body facing said oil port, wherein said seat surface includes an annular step formed therein and defining a first seat surface on an inner peripheral side and a second seat surface on an outer peripheral side such that said first seat surface is closer to said oil port than said second seat surface, and wherein said seal is configured to be seated on said first seat surface, and said seal holder is configured to be seated on said second seat surface.

2. The accumulator according to claim 1, wherein said second pressure release flow passage is formed between said metal member and said seat surface by engagement of said metal member with said seal holder after disappearance of said elastic body.

3. The accumulator according to claim 1, wherein said accumulator is an internal gas type accumulator in which said gas chamber is arranged in an inner peripheral side of said bellows and said seat surface is formed by an inner end surface of said housing, or wherein said accumulator is an external gas type accumulator in which said gas chamber is arranged in an outer peripheral side of said bellows and said seat surface is formed by an end surface of a stay fixed to the inner portion of said housing.

4. The accumulator according to claim 2, wherein said accumulator is an internal gas type accumulator in which said gas chamber is arranged in an inner peripheral side of said bellows and said seat surface is formed by an inner end surface of said housing, or wherein said accumulator is an external gas type accumulator in which said gas chamber is arranged in an outer peripheral side of said bellows and said seat surface is formed by an end surface of a stay fixed to the inner portion of said housing.

5. The accumulator according to claim 1, wherein said concavities and convexities are provided in a surface of said seal holder facing said second seat surface.

* * * * *